3,082,218
PROCESS FOR PREPARING SUBSTITUTED DIHYDROXYANTHRAQUINONES

Edwin C. Buxbaum and Robert H. Terss, Wilmington, Del., assignors to E. I. du Pont de Nemours and Company, Wilmington, Del., a corporation of Delaware
No Drawing. Filed May 26, 1959, Ser. No. 815,778
2 Claims. (Cl. 260—380)

This invention is directed to a novel mixture of arylamino-1,8-dihydroxyanthraquinones the main component of which (4-arylamino-5-nitro-1,8-dihydroxyanthraquinone) is old. The present invention is also directed to a novel process utilizing a new and limited combination of old steps in addition to selecting an unorthodox starting material, namely, the crude mixture of dinitrated chrysazin.

The inventor faced the problem of providing an economical blue dye suitable for dyeing polyester fibers and cellulose triacetate, said dye to be characterized by the following combination of desirable properties; (a) light fastness, (b) wash fastness, (c) good build-up, (d) good application properties, e.g., freedom from "tar-formation" in dyebaths over 4% concentration at high temperatures and (e) especially good for use in mixtures to provide browns, charcoals and navies on said fibers. It will be noted that these shades usually appear as deep shades which require dyes having good build-up properties.

The unexpected results achieved in this invention are predicated on the use of the crude mixture of dinitrated-1,8-dihydroxyanthraquinone in the condensation step with arylamines. This latter feature, together with the specific isolation method defined below, and the necessary alkaline purification, are combined as the basis of the present invention and to provide the novel and unique products. The valuable properties of the arylamino-1,8-dihydroxyanthraquinone compounds of the present invention are attributed to the fact that these colors are unique mixtures of several compounds made as described and claimed herein.

It is an object of the present invention to provide novel mixtures of arylamino-1,8-dihydroxyanthraquinones, said anthraquinones exhibiting significant and unexpected valuable dyeing properties.

It is also an object of the present invention to provide a novel process for producing these dye mixtures.

These and other objects will become apparent in the following description and claims.

More specifically, the present invention is directed to a process for the manufacture of arylamino-1,8-dihydroxyanthraquinones from arylamines of the benzene series and nitrated chrysazin, which process comprises heating a crude mixture of dinitrated chrysazin with an arylamine of the benzene series in an inert organic solvent until about one nitro group is replaced by an arylamino group.

The heretofore described novel process may be supplemented by isolating the resulting product by pouring the resulting condensation mass into at least 3 parts by weight per part of nitrated chrysazin of an inert water-miscible organic solvent while controlling the temperature of the drowned mass between 0° and 30° C. (preferably 5° to 15° C.), followed by filtering off the resulting granular product. The latter step is followed by heating the resulting granular product in an aqueous dilute alkaline medium, followed by filtration.

In the present novel process the nitrated chrysazin is preferably obtained by agitating 1 part of chrysazin with 0.45 to 0.6 part (1.7–2.3 moles) of $HNO_3$ in at least 4 parts of 93 to 100% $H_2SO_4$ at about 15° to 35° C. until about 2 nitro groups are introduced into each molecule of chrysazin, followed by drowning the nitration mass in water, filtering, washing the product acid-free, and drying.

The present invention is also directed to the compositions of mixed arylamino-hydroxyanthraquinones obtained by the heretofore described novel process.

Representative examples illustrating the present invention follow; all parts are by weight.

EXAMPLE 1

*Preparation of Crude Dinitrochrysazin*

Into a reaction vessel 1500 parts of 98% sulfuric acid are charged and while agitating vigorously, 120 parts of anhydrous boric acid are added. Agitation for one-half hour follows and then 240 parts of 1,8-dihydroxyanthraquinone (chrysazin) are added over a period of about one-half hour. When the chrysazin is in solution, the reaction mass is cooled to 10–15° C.; then, 470 parts of a sulfuric acid-nitric acid mixture containing 28% $HNO_3$ (equivalent to 131.6 parts of 100% $HNO_3$) are added in one to two hours at a temperature of 10–15° C. When the addition of the sulfuric acid-nitric acid mixture has been completed, the charge is agitated for 2½ hours at 10–15° C. The nitration mass is then allowed to rise to 20–30° C. slowly over a period of 6 to 8 hours.

The acid nitration mass is poured slowly over a period of one-half hour into 15,000 parts of cold water at 10–15° C. The temperature of the water after the addition of the nitration mass will be about 30–35 ° C.; the precipitated dinitrodihydroxyanthraquinone is filtered off and washed with water until the cake is acid free. The compound is then dried at 100–110° C. or used as a wet press cake if desired.

In the preceding example, the acidity of the acid can be varied from 93% to 100%. With acid of higher strength, it is preferred to use lower temperatures in the nitration to avoid sulfonation which is undesirable.

The amount of $HNO_3$ used can be subjected to considerable variation. In the preceding example, an excess of about 4.5% over 2 moles per mole of chrysazin is used. Variations in shade in the colors produced from this intermediate, as described in the examples which follow, can be obtained by varying the degree of nitration which is dependent upon the amount of nitric acid used. For instance, after condensation with aniline, dinitrochrysazin which has been nitrated with amounts of nitric acid with excesses larger than said 4.5% affords shades greener than those obtained with the product as nitrated in the above example. By using a lesser amount of nitric acid, the colors produced will be redder in shade. By this means considerable control of the shade is possible. The recommended limits of $HNO_3$ are 0.45 to 0.6 part (same as 1.7 to 2.3 moles per mole) of $HNO_3$ per part of chrysazin. Below this lower limit the shade (of the condensation product with arylamines) would be affected undesirably by larger amounts of unreacted chrysazin and mononitrochrysazin. Above the upper limit, trinitrochrysazins are formed which give greener and duller shades when condensed with arylamines.

EXAMPLE 2

*Preparation of the Condensation Product of Aniline With the Dinitrochrysazin Prepared in Example 1*

Into a reaction vessel is charged 107.5 parts of "Cellosolve," 2-(ethoxy)ethanol, and 100 parts of aniline, followed by heating to 100–110° C. and adding 100 parts of dinitrochrysazin, as prepared in Example 1, over a period of one-half hour. When all of the dinitrochrysazin has been added, the reaction mass is heated to 120–130° C. over a period of several hours; the temperature is then held at 120–130° C. for 20 hours. The reaction mass is then cooled to 80° C. and poured slowly into a mixture of 300 parts of methanol and 100 parts of acetone which is held at 5–10° C. while the reaction mass is poured into it. When the dilution has been completed, the color precipitates out of solution in the form of very fine granular particles which filter with ease; the precipitated, crude color is then filtered and washed with a mixture of 300 parts of methanol and 100 parts of acetone and the filter cake then washed with 1000 parts of cold water.

The crude precipitated color thus obtained is then charged into 2500 parts of $H_2O$ in which has been dissolved 96 parts of dibasic sodium phosphate $$(Na_2HPO_4 \cdot 7H_2O)$$

A small amount (2 parts) of dispersing agent (polyisopropylnaphthalenesulfonic acid) is also added to help the extraction; the extraction mass is then heated to 85–90° C. and agitated for one hour. The hot extraction mass is then filtered and the purified product washed with 1000 parts of hot water and the color dried at 100–110° C.

EXAMPLE 3

In place of aniline, as used in Example 2, xylidines, toluidines, chloro- or bromo-anilines, anisidines or other similar arylamines may be utilized to obtain products which are similar in character and have the good application properties of the anilino product but which vary in shade from the product of Example 2. By varying the arylamine, redder or greener shades than those produced with aniline can be obtained.

In place of the methanol-acetone mixture used in Example 2 for the dilution, acetone or methanol alone, alcohols such as propyl, isopropyl or ethanol, 2-(ethoxy) ethanol, dioxane or any other inert water-soluble organic solvent may be utilized to give substantially the same results. The temperature of dilution can be varied from —5° C. to 20° C.

EXAMPLE 4

Preparation of Color For Use in Dyeing

The color as obtained in Example 2 is milled to reduce the particle size below 2 microns by employing any of the usual milling procedures, e.g., the method described in Example 1 of U.S. 2,816,115. The finely-divided dye is then separated, dried and pulverized.

In this form, the dye imparts a greenish-blue shade to polyester fiber when dyed by any of the usual disperse dye methods for this fiber. The dyed fabric shows excellent light, wash, and sublimation fastness.

A typical disperse dye method is illustrated as follows, in which a 4% dyeing is made on polyester fiber.

Into a beaker or reflux tube of 800 ml. capacity, add 300 ml. of water and heat to 120° to 130° F. Add the following as 10% aqueous solutions: (a) 0.2 gram of the condensation product of 20 moles of ethylene oxide and one mole of oleyl alcohol, (b) 0.6 gram of a long chain hydrocarbon sodium sulfonate and (c) 2 grams of the sodium salt of o-phenylphenol. Add water to adjust the dyebath volume to 400 ml. Adjust the pH to 5.0 using 10% acetic acid. Then add 0.4 gram of the dye of Example 2 (finely divided as described above, and pasted with a 10% solution of a long chain hydrocarbon sodium sulfonate) and 10 grams of polyester fiber (piece goods of staple or spun fiber).

After boiling the dyebath for 2 hours, remove the dyed fiber, rinse it in water, scour it by heating for 30 minutes at 180° F. in an aqueous bath containing 0.5 gram per liter of each of the following: NaOH, cetyl betaine and sodium hydrosulfite. Again rinse the fiber in water and dry it. Then heat-treat this dyed fiber for one minute at 374° F.

A strong blue dyeing is obtained which exhibits excellent wash and light fastness properties, good buildup and level dyeing.

Alkalies for the purification step of the present novel process, other than $Na_2HPO_4$, include NaOH, KOH, $NH_4OH$ and $Na_2CO_3$ which may be utilized to give similar results as those achieved in the specific examples.

The disperse dyes produced by the process of this invention can be used to dye fibers such as cellulose triacetate and especially polyester fibers (in either the filament or staple (spun) fiber forms) in blue shades of good fastness properties.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In the process of manufacturing arylaminonitro-1,8-dihydroxyanthraquinone from aryl amines of the benzene series and dinitrated chrysazin, the improvement wherein said process is carried out by first (1) preparing a crude mixture of dinitrated chrysazin produced by the direct nitration of chrysazin, said nitration being accomplished by agitating one part by weight of chrysazin with from 0.45 to about 0.6 part $HNO_3$ in at least 4 parts of 93% to 100% $H_2SO_4$, at a temperature within the range of 15° to 35° C., followed by drowning the nitration mass in water, filtering and washing the product acid-free, (2) condensing the resulting dinitrated chrysazin with an arylamine taken from the group consisting of aniline and substituted anilines, said substituted anilines being selected from the group consisting of methyl, methoxy, chlorine and bromine substituted anilines, said condensation being effected by heating said dinitrated chrysazin and said arylamine in an inert organic solvent until about one nitro group in each dinitrated chrysazin molecule is replaced by an arylamino group, (3) followed by drowning the resulting condensation product into at least 3 parts by weight per part of said dinitrated chrysazin of a water-miscible organic solvent, the temperature of the drowned mass being maintained within the range of 0° to 30° C., and (4) filtering off the resulting granular dye product followed by purifying said product by heating in an aqueous dilute alkaline medium and filtering off the purified resulting dye.

2. A process according to claim 1 wherein said aryl amine is aniline.

References Cited in the file of this patent

UNITED STATES PATENTS

| | | |
|---|---|---|
| 2,480,269 | Seymour et al. | Aug. 30, 1949 |
| 2,641,602 | Straley et al. | June 9, 1953 |
| 2,651,641 | Straley et al. | Sept. 8, 1953 |
| 2,726,251 | Dickey et al. | Dec. 6, 1955 |

FOREIGN PATENTS

| | | |
|---|---|---|
| 98,639 | Germany | July 23, 1897 |
| 251,123 | Switzerland | July 16, 1948 |
| 259,350 | Switzerland | June 16, 1949 |
| 259,351 | Switzerland | June 16, 1949 |